(12) United States Patent
Jen et al.

(10) Patent No.: US 9,047,921 B2
(45) Date of Patent: Jun. 2, 2015

(54) ADJUSTING RECORDING DENSITY IN A CIRCUMFERENTIAL DIRECTION

(75) Inventors: David Jen, San Jose, CA (US); Indukumar Kalahasthi, San Jose, CA (US); Kris Schouterden, San Jose, CA (US); Douglas Zuercher, Morgan Hill, CA (US)

(73) Assignee: HGST Netherlands B.V., Amsterdam (NL)

( * ) Notice: Subject to any disclaimer, the term of this patent is extended or adjusted under 35 U.S.C. 154(b) by 1006 days.

(21) Appl. No.: 12/622,109

(22) Filed: Nov. 19, 2009

(65) Prior Publication Data

US 2011/0116186 A1 May 19, 2011

(51) Int. Cl.
| | | |
|---|---|---|
| G11B 15/18 | (2006.01) | |
| G11B 5/596 | (2006.01) | |
| G11B 20/12 | (2006.01) | |
| G11B 5/00 | (2006.01) | |

(52) U.S. Cl.
CPC .... *G11B 20/1217* (2013.01); *G11B 2005/0005* (2013.01); *G11B 2020/1292* (2013.01); *G11B 2020/1298* (2013.01); *G11B 2220/2516* (2013.01)

(58) Field of Classification Search
None
See application file for complete search history.

(56) References Cited

U.S. PATENT DOCUMENTS

| | | | |
|---|---|---|---|
| 4,894,734 A | | 1/1990 | Fischler et al. |
| 5,036,408 A | * | 7/1991 | Leis et al. ........................ 360/48 |
| 5,253,124 A | * | 10/1993 | Kondo et al. .................... 360/48 |
| 5,293,565 A | * | 3/1994 | Jaquette et al. ............. 369/275.3 |
| 5,436,878 A | * | 7/1995 | Yamaguchi et al. .......... 369/47.1 |
| 5,559,654 A | | 9/1996 | Das |
| 5,768,044 A | * | 6/1998 | Hetzler et al. ............. 360/77.08 |
| 6,467,021 B1 | * | 10/2002 | Sinclair ......................... 711/113 |
| 6,590,728 B1 | * | 7/2003 | Yang ............................... 360/48 |
| 6,950,967 B1 | * | 9/2005 | Brunnett et al. ................ 714/42 |
| 6,956,710 B2 | | 10/2005 | Yun et al. |
| 7,012,771 B1 | | 3/2006 | Asgari et al. |
| 7,046,476 B1 | * | 5/2006 | Albrecht et al. ........... 360/77.02 |
| 7,046,597 B2 | * | 5/2006 | Usui et al. .................. 369/47.41 |
| 7,337,263 B2 | * | 2/2008 | Cho et al. ........................... 711/4 |
| 7,586,707 B2 | * | 9/2009 | Yoshida et al. ................. 360/51 |

(Continued)

OTHER PUBLICATIONS

Thomas M Coughlin, Hiah Density Hard Disk Drive Trends in USA, artide available online at http://www.tomcoughlin.com/Techpapers/head&medium.pdf, printed no later than Jul. 10, 2009.

(Continued)

*Primary Examiner* — K. Wong
(74) *Attorney, Agent, or Firm* — Brokaw Patent Law PC; Christopher J. Brokaw

(57) ABSTRACT

Approaches for adjusting the recording density of a recording medium in a circumferential direction are disclosed. A hard-disk drive includes one or more electronic components configured to divide a track, of a plurality of concentric tracks on a magnetic-recording disk, into a plurality of portions, and write data to each of the plurality of portions at a recording density that is independent of the recording density used for any of the other portions. Data may be written to a first portion of a track at a different frequency than to a second portion of the same track. The frequency at which data is written may be adjusted for different portions of the same track to allow the frequency to be reduced at certain portions shown to have relatively higher soft error rate while increasing the frequency for other portions to achieve a desired average error rate for the track.

19 Claims, 6 Drawing Sheets

(56) References Cited

U.S. PATENT DOCUMENTS

| | | | |
|---|---|---|---|
| 7,916,421 B1 * | 3/2011 | Liikanen et al. | ........... 360/77.01 |
| 2002/0141099 A1 | 10/2002 | Ng et al. | |
| 2006/0227445 A1 | 10/2006 | Chiao et al. | |
| 2007/0183072 A1 | 8/2007 | Lee | |

OTHER PUBLICATIONS

Seiichi Sugaya, Trends in Enterprise Hard Disk Drives, Fujitsu Sci. Tech J., 42, 1, p. 61-71 (Jan. 2008), available online at http://www.fujitsu.com/downloads/MAG/vol42-1/paper08.pdf.

* cited by examiner

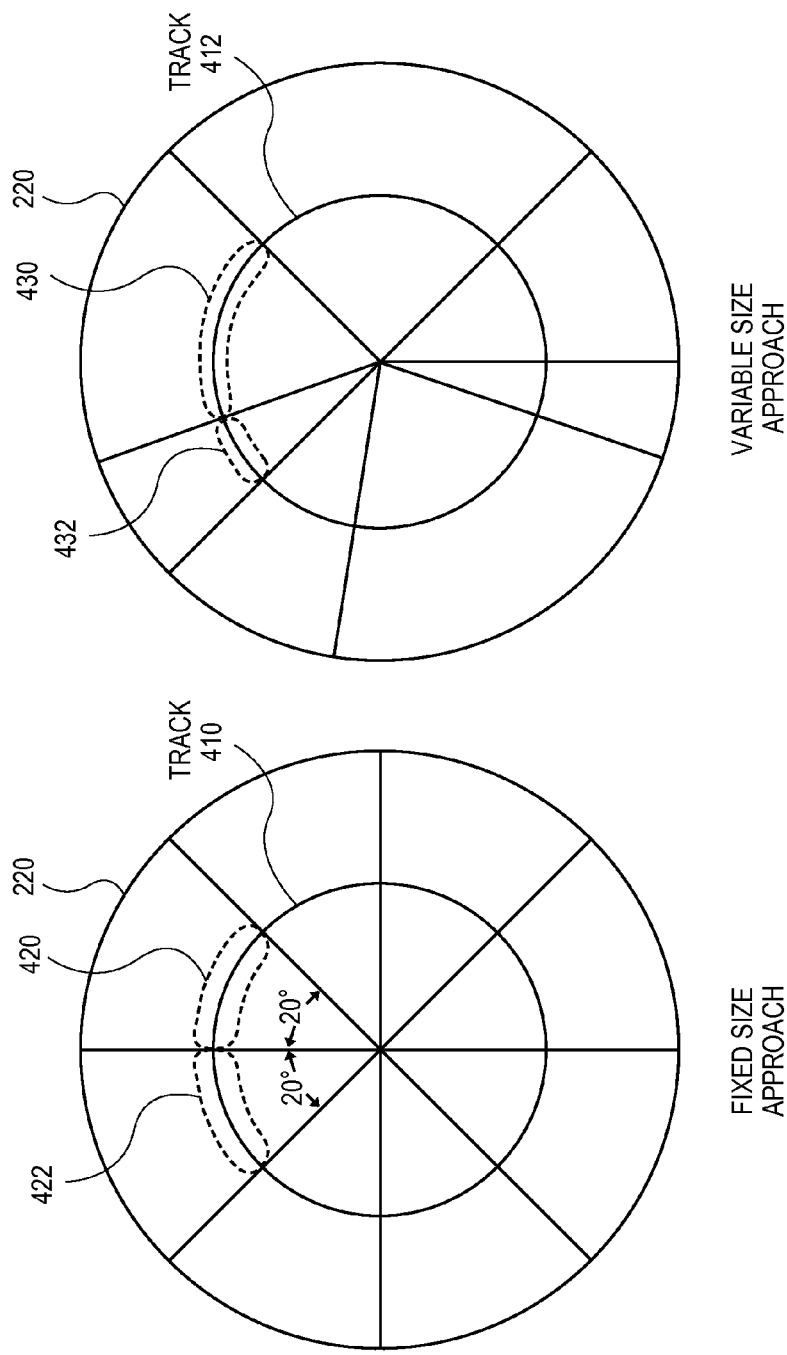

ADJUSTING RECORDING DENSITY IN A CIRCUMFERENTIAL DIRECTION

FIELD OF THE INVENTION

Embodiments of the invention generally relate to adjusting the recording density of a circular recording medium in a circumferential direction.

BACKGROUND OF THE INVENTION

A hard-disk drive (HDD) is a non-volatile storage device that is housed in a protective enclosure and stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head which is positioned over a specific location of a disk by an actuator.

A read/write head uses a magnetic field to read data from and write data to the surface of a magnetic-recording disk. As a magnetic dipole field decreases rapidly with distance from a magnetic pole, the distance between a read/write head and the surface of a magnetic-recording disk must be tightly controlled. To provide a uniform distance between a read/write head and the surface of a magnetic-recording disk, an actuator relies on air pressure inside the hard drive enclosure to support the read/write heads at the proper distance away from the surface of the magnetic-recording disk while the magnetic-recording disk rotates. A read/write head therefore is said to "fly" over the surface of the magnetic-recording disk. That is, the air pulled along by a spinning magnetic-recording disk forces the head away from the surface of the magnetic-recording disk. When the magnetic-recording disk stops spinning, a read/write head must either "land" or be pulled away.

A write-head of an HDD records data onto the surface of a magnetic-recording disk in a series of concentric tracks. The greater the frequency of the magnetic write field used to write data to a track on the magnetic-recording disk, the greater the amount of data that can be stored on the track (referred to as recording density).

While it is desirable to store as much data as possible on a magnetic-recording disk, there are practical limits on how much data can be recorded to a single track. The chance of encountering an error in reading data written to a track increases as the density of the data written to the track increases. Also, the velocity of the disk increases with distance from the center of the disk; thus, the density of data written to a disk tends to be greater near the center of the disk because tracks near the center of the disk move slower under the write-head than tracks further away from the center of the disk. As a result, the frequency at which data is written (the "write frequency") to a particular track of a platter is typically selected to be the highest frequency at which data may be safely read from the track nearest the center of the disk without exceeding a particular error rate.

Some hard-disk drives may use an approach referred to as zone bit recording. In zone bit recording, a magnetic-recording disk is logically divided into a plurality of concentric zones. Each of the plurality of zones may include a number of different tracks on the magnetic-recording disk. For example, a hard-disk drive may logically divide the disk into a set of 10 concentric zones, and each concentric zone may include 10% of the tracks on the magnetic-recording disk. The hard-disk drive writes data to tracks within the same concentric zone at the same write frequency; however, the hard-disk drive writes data to tracks of different concentric zones at different write frequencies. The hard-disk drive may increase the write frequency when moving from one concentric zone to an adjacent concentric zone that is further from the center of the disk, and similarly decrease the write frequency when moving from one concentric zone to an adjacent concentric zone that is closer to the center of the disk. In this way, the change in the write frequency between different concentric zones may help offset the natural tendency for the density of data to decrease with distance from the center of the disk due to the increase in speed at which the tracks move under the write-head. As a result, the recording density across the plurality zones on the disk is kept within a desired range to ensure that the soft error rate does not exceed an undesirable level.

SUMMARY OF THE INVENTION

It is observed that the current process for selecting a recording density for a track of a magnetic-recording disk is based on the assumption that the characteristics of the magnetic-recording disk are uniform around the length of the track. However, for a variety of reasons, such as magnetic sputtering imperfections, polishing irregularities, warping distortions, or clamping distortions, that may not necessarily be the case. If the characteristics of a magnetic-recording disk are not uniform around the length of a track, then a selected recording density for the track may be excessive in weaker regions of the track, which may lead to a poor error rate of data read from the weaker region of the track.

Approaches are discussed herein for adjusting the recording density of a track of a magnetic-recording disk in the circumferential direction. An HDD according to an embodiment of the invention may compromise one or more electronic components configured to divide a track into a plurality of portions, and write data to each of the plurality of portions at a recording density that is independent of any of the other plurality of portions. Thus, data may be written to a first portion of a track at a different frequency than to a second portion of the same track. The frequency at which data is written to may be adjusted for different portions of the same track to reduce the frequency for certain portions shown to have relatively higher soft error rate while increasing the frequency for other portions shown to have relatively lower soft error rate. In this way, the recording density of data written to a single track may be adjusted so that the recording density reflects the relative strength or weakness of the track at the position where the data is written to enable a desired average error rate for the track as a whole to be obtained without unduly stressing the weaker portions of the track.

Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 4B is an illustration of tracks on magnetic-recording disks divided into a plurality of portions according to various embodiments of the invention.

DETAILED DESCRIPTION OF THE INVENTION

Approaches for adjusting the recording density of a circular recording medium in a circumferential direction are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

The Relationship Between Recording Density and Error Rate

The recording density of a magnetic-recording medium can affect the soft error rate (SER) of data written thereto. As such, the particular recording density (BPI) for a recording medium is generally selected to ensure the soft error rate of data written/read from the recording medium does not exceed a desired (maximum) error rate.

One approach for determining the recording density shall be referred to as the "worst error rate" approach. In the worst error rate approach, the error rate around the length of a track (or "around the rev") is measured, and the worst error rate for any part of the track is used to determine the constant recording density for the track.

Figure 1:
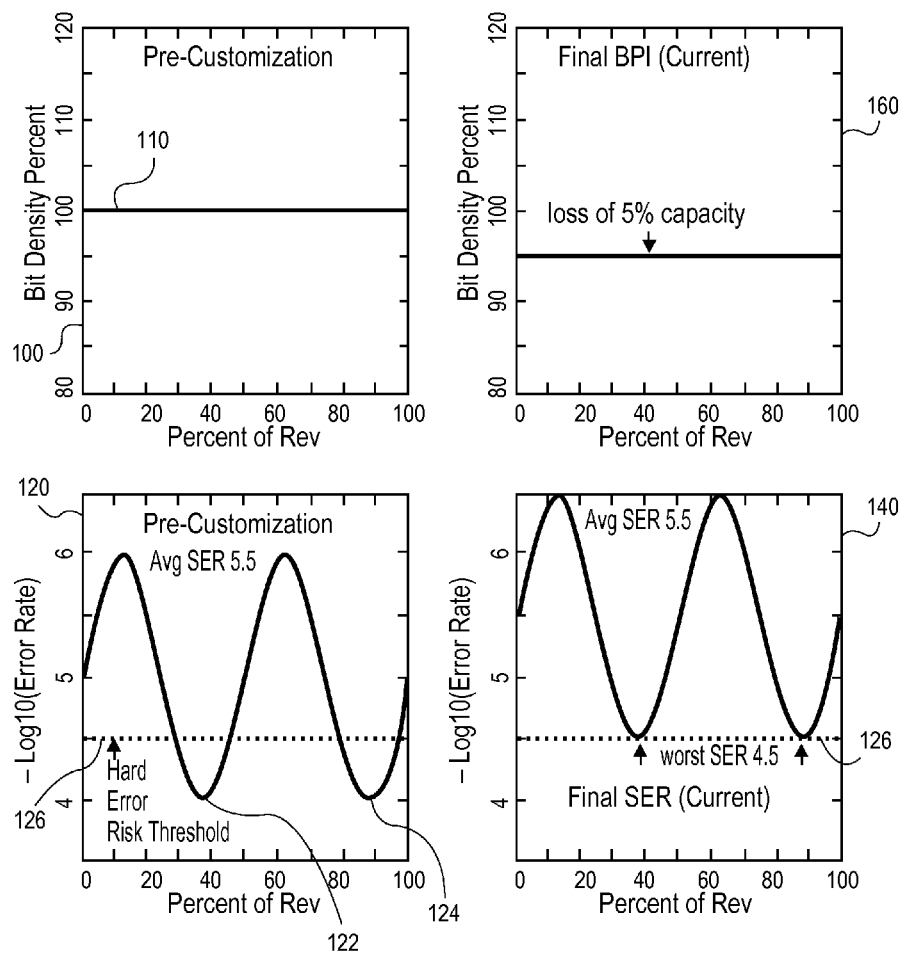
FIG. 1 is an illustration of the worst error rate approach for determining recording density according to the prior art.

To illustrate, consider FIG. 1, which is an illustration of the worst error rate approach for determining the recording density of a track. Graphs 100 and 160 describe the bit density around the rev and graphs 120 and 140 describe the error rate around the rev for a typical warped media surface with a 2x/rev curvature-induced spacing fluctuation. Graphs 100 and 120 depict an initial customization for this track using default configuration settings. After the track is tested at the default bits per inch (BPI), the soft error rate (SER) is found to contain two weak areas, namely valleys 122 and 124, which dip below the safe operating limit 126 for the soft error rate. Thus, the portion of the track corresponding to valleys 122 and 124 yield an unacceptable number of soft errors.

To compensate for valleys 122 and 124 dipping below safe operating limit 126, the BPI for this track is decreased so that the worst error rate for the track does not exceed the safe operating limit 126, as shown in graphs 140 and 160. As shown in graph 160, the consequence of adjusting the BPI in this manner is a loss of 5% in the capacity of this track. Thus, the worst error rate approach is undesirable because it reduces the net capacity of the entire track, rather than just the weak regions of the track associated with the higher soft error rate. This loss of net recording density increases the likelihood that the HDD will be unable to meet its capacity quota, thereby increasing the risk for yield loss.

Another approach for determining the recording density shall be referred to as the "defect-list" approach. In the defect-list approach, the soft error rate is measured around the length of the track to identify weak locations. Weak sectors of the track are not used and the location of a weak sector is added to a defect list. This approach has the advantage that only the weak sectors are affected; however, it has the disadvantage that if a significant portion of the media is in the weaker state, then the defect-list will overflow. For example, a typical terabyte HDD has two billion raw blocks, and a defect-list size of one million defects would be considered very large, but yet it would only represent 0.05% of the raw drive capacity. Thus, the defect-list approach is only workable when the number of media imperfections is very small, which may be true for scratches, but would not be true for clamping-induced distortions and other imperfections.

Having described the problems and challenges presented by prior approaches for determining recording density, a description of illustrative embodiments of the invention will now be presented.

Physical Description of Illustrative Embodiments of the Invention

Figure 2:
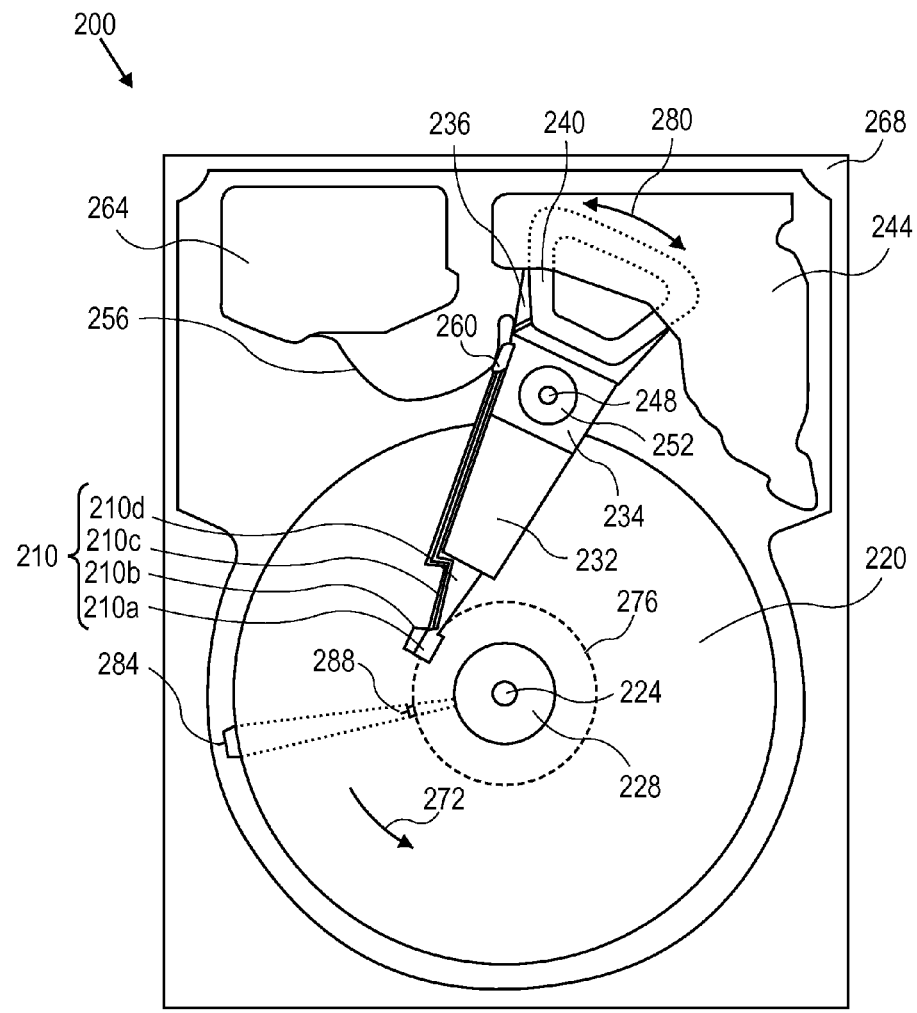
FIG. 2 is a plan view of an HDD according to an embodiment of the invention.

With reference to FIG. 2, in accordance with an embodiment of the invention, a plan view of a HDD 200 is shown. FIG. 2 illustrates the functional arrangement of components of the HDD including a slider 210b including a magnetic-recording head 210a. The HDD 200 includes at least one HGA 210 including the head 210a, a lead suspension 210c attached to the head 210a, and a load beam 210d attached to the slider 210b, which includes the head 210a at a distal end of the slider 210b; the slider 210b is attached at the distal end of the load beam 210d to a gimbal portion of the load beam 210d. The HDD 200 also includes at least one magnetic-recording disk 220 rotatably mounted on a spindle 224 and a drive motor (not shown) attached to the spindle 224 for rotating the disk 220. The head 210a includes a write element, a so-called writer, and a read element, a so-called reader, for respectively writing and reading information stored on the disk 220 of the HDD 200. The disk 220 or a plurality (not shown) of disks may be affixed to the spindle 224 with a disk clamp 228. The HDD 200 further includes an arm 232 attached to the HGA 210, a carriage 234, a voice-coil motor (VCM) that includes an armature 236 including a voice coil 240 attached to the carriage 234; and a stator 244 including a voice-coil magnet (not shown); the armature 236 of the VCM is attached to the carriage 234 and is configured to move the arm 232 and the HGA 210 to access portions of the disk 220 being mounted on a pivot-shaft 248 with an interposed pivot-bearing assembly 252.

With further reference to FIG. 2, in accordance with an embodiment of the invention, electrical signals, for example, current to the voice coil 240 of the VCM, write signal to and read signal from the read/write head (typically PMR) 210a, are provided by a flexible cable 256. Interconnection between the flexible cable 256 and the head 210a may be provided by an arm-electronics (AE) module 260, which may have an on-board pre-amplifier for the read signal, as well as other read-channel and write-channel electronic components. The flexible cable 256 is coupled to an electrical-connector block 264, which provides electrical communication through electrical feedthroughs (not shown) provided by an HDD housing 268. The HDD housing 268, also referred to as a casting, depending upon whether the HDD housing is cast, in conjunction with an HDD cover (not shown) provides a sealed, protective enclosure for the information storage components of the HDD 200.

With further reference to FIG. 2, in accordance with an embodiment of the invention, other electronic components (not shown), including a disk controller and servo electronics including a digital-signal processor (DSP), provide electrical signals to the drive motor, the voice coil 240 of the VCM and the head 210a of the HGA 210. The electrical signal provided to the drive motor enables the drive motor to spin providing a torque to the spindle 224 which is in turn transmitted to the disk 220 that is affixed to the spindle 224 by the disk clamp 228; as a result, the disk 220 spins in a direction 272. The spinning disk 220 creates a cushion of air that acts as an air-bearing on which the air-bearing surface (ABS) of the slider 210b rides so that the slider 210b flies above the surface of the disk 220 without making contact with a thin magnetic-recording medium of the disk 220 in which information is recorded. The electrical signal provided to the voice coil 240 of the VCM enables the head 210a of the HGA 210 to access a track 276 on which information is recorded. Thus, the armature 236 of the VCM swings through an arc 280 which enables the HGA 210 attached to the armature 236 by the arm 232 to access various tracks on the disk 220. Information is stored on the disk 220 in a plurality of concentric tracks (not shown) arranged in sectors on the disk 220, for example, sector 284. Correspondingly, each track is composed of a plurality of sectored track portions, for example, sectored track portion 288. Each sectored track portion 288 is composed of recorded data and a header containing a servo-burst-signal pattern, for example, an ABCD-servo-burst-signal pattern, information that identifies the track 276, and error correction code information. In accessing the track 276, the read element of the head 210a of the HGA 210 reads the servo-burst-signal pattern which provides a position-error-signal (PES) to the servo electronics, which controls the electrical signal provided to the voice coil 240 of the VCM, enabling the head 210a to follow the track 276. Upon finding the track 276 and identifying a particular sectored track portion 288, the head 210a either reads data from the track 276 or writes data to the track 276 depending on instructions received by the disk controller from an external agent, for example, a microprocessor of a computer system.

Embodiments of the invention also encompass HDD 200 that includes the HGA 210, the disk 220 rotatably mounted on the spindle 224, the arm 232 attached to the HGA 210 including the slider 210b including the head 210a.

Figure 3:
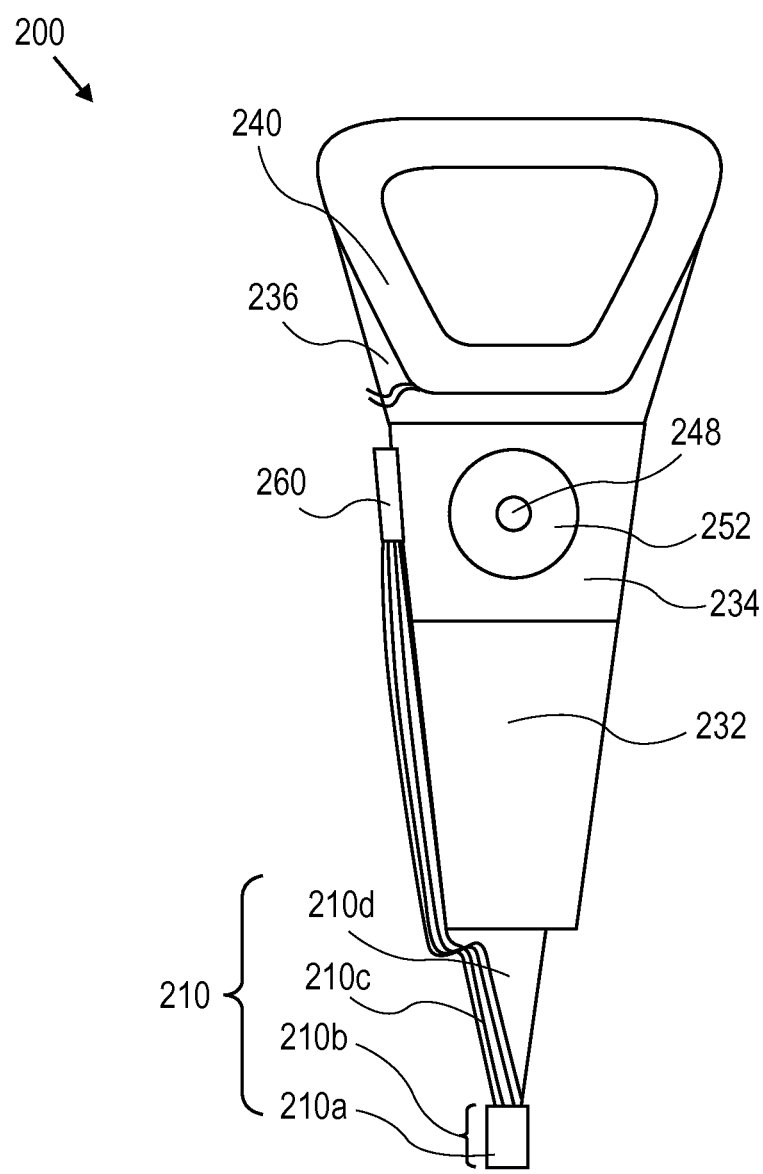
FIG. 3 is a plan view of a head-arm-assembly (HAA) according to an embodiment of the invention.

With reference now to FIG. 3, in accordance with an embodiment of the invention, a plan view of a head-arm-assembly (HAA) including the HGA 210 is shown. FIG. 2 illustrates the functional arrangement of the HAA with respect to the HGA 210. The HAA includes the arm 232 and HGA 210 including the slider 210b including the head 210a. The HAA is attached at the arm 232 to the carriage 234. In the case of an HDD having multiple disks, or platters as disks are sometimes referred to in the art, the carriage 234 is called an "E-block," or comb, because the carriage is arranged to carry a ganged array of arms that gives it the appearance of a comb. As shown in FIG. 3, the armature 236 of the VCM is attached to the carriage 234 and the voice coil 240 is attached to the armature 236. The AE 260 may be attached to the carriage 234 as shown. The carriage 234 is mounted on the pivot-shaft 248 with the interposed pivot-bearing assembly 252.

Embodiments of the invention may include one or more electrical components configured to (a) divide one or more tracks, of a plurality of concentric tracks on disk 220, into a plurality of portions, and (b) write data to each of the plurality of portions at a bit density that is independent of any other of the plurality of portions. Such one or more electrical components may be, but need not be, implemented in arm-electronics (AE) module 260. Also, in an embodiment, the one or more electronic components may include the disk controller and/or the firmware of HDD 200.

Having described the physical description of an illustrative embodiment of the invention, discussion will now be presented describing how embodiments of the invention may be used to adjust the recording density of a circular recording medium in a circumferential direction according to embodiments of the invention.

Adjusting the Recording Density in a Circumferential Direction

Figure 4A:
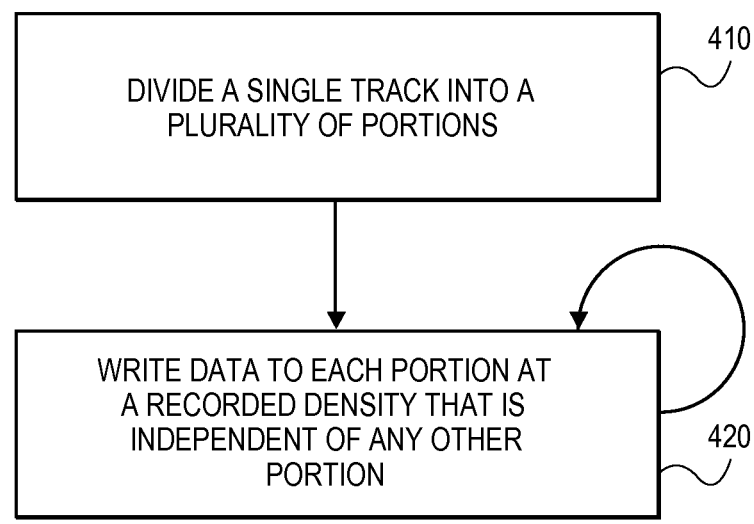
FIG. 4A is a flowchart illustrating the functional steps of adjusting the recording density of a circular recording medium in a circumferential direction according to an embodiment of the invention.

FIG. 4A is a flowchart illustrating the functional steps of adjusting the recording density of a circular recording medium in a circumferential direction according to an embodiment of the invention. In an embodiment, step 410 of FIG. 4A may be performed once during, or contemporaneous with, the manufacturing of HDD 200, while step 420 may be performed repeatedly during the normal operation of HDD 200.

In step 410, a single track is divided into a plurality of portions ("track portions"). Each of the plurality of track portions may be written to, by embodiments of the invention, using a different frequency than used on other track portions of the same track. Thus, each track portion may be written to using a write frequency that is independent of any track portion of the same track.

In an embodiment, one or more electrical components of HDD 200 may perform step 410. For example, the hard disk controller working in conjunction with the firmware of HDD 200 may perform or assist in the performance of step 410, as explained in greater detail below in the section entitled "Firmware Modifications."

Embodiments of the invention may use several approaches for dividing a single track into a plurality of track portions. According to one approach referred to as the "fixed size approach," a single track is divided into a plurality of equal size portions. In the fixed size approach, each portion of a track is the same size as any other portion on the same track. In the fixed size approach, track portions around the length of the track may be identified by angular positions measured from the center of disk 220. For example, disk 220 may be divided into a plurality of wedge-shaped portions, where each wedge-shaped portion has an interior angle that is the same and has an endpoint at the center of disk 220. For example, the beginning and end of each track portion of a track may be at an angle in the range of 20°-30° from the center of disk 200.

FIG. 4B is an illustration of tracks on magnetic-recording disks that have been divided into a plurality of track portions according to various embodiments of the invention. As shown in FIG. 4B, in the fixed size approach, track portion 420 of track 410 is the same size as track portion 422 of track 410. For clarity, only eight track portions of track 410 are depicted in the fixed size approach, although a track may be divided into any number of fixed size track portions. For example, if the interior angle of each wedge-shaped portion is 20°, then a track on disk 220 will be divided into 18 different track portions.

After each track portion of a track is identified, the error rate of each track portion is measured at a default recording density. The recording density for each track portion may then be adjusted according to the error rate of that portion. If the soft error rate of a particular track portion is poor, then the recording density (BPI) for that portion is relaxed; conversely, if the soft error rate of a particular track portion is strong, then the recording density (BPI) for that track portion is increased. In an embodiment, the amount that the recording density (BPI) is increased across all track portions for a particular track is proportional to the amount that the recording density (BPI) is needed to be relaxed across all track portions of the particular track to accommodate the soft error rate of the weaker track portions of the particular track. In this way, the final soft error rate of the track measured at the adjusted recording densities for all track portions of the track is equal to a desired (maximum) averaged error rate around the length of the track.

According to another approach for dividing a single track into a plurality of track portions (denoted the "variable size approach"), a single track is divided into a plurality of variable size track portions. In the variable size approach, the soft error rate of the entire track is measured at a default recording density. After measuring the soft error rate of the entire track at the default recording density, weaker areas of the track (i.e., those areas having a higher soft error rate) and stronger areas of the track (i.e., those areas having a lower soft error rate) may be identified. Based on this information, the dimensions of the variable size track portions for the track may be identified. For example, it may be advantageous to select a length and position of a particular track portion such that the track portion covers a weaker area of the track without covering other areas of the track that are not weak. In this way, the write frequency can be adjusted for weaker areas without impacting the write frequency used to write data to other portions of the track which can handle a higher write frequency.

Once the variable size track portions for the track are identified, the recording density for each variable size track portion may be determined. In an embodiment, the amount that the recording density is increased across all track portions for the track is proportional to the amount that the recording density needs to be relaxed across all track portions of the track to accommodate the error rate of the weaker portions of the track. In this way, the final soft error rate of the track measured at the adjusted recording densities for all track portions of the track is equal to a desired (maximum) averaged error rate around the length of the track.

As shown in FIG. 4B, in the variable size approach, track portion 430 of track 412 is a different size than track portion 432 of track 412. While only seven track portions of track 412 are depicted in the variable size approach shown in FIG. 4B for the sake of clarity, a track may be divided into any number of variable size track portions. While it is contemplated that embodiments of the invention will typically use either the fixed size approach or the variable size approach in performing step 410, certain embodiments of the invention may perform step 410 for some tracks on disk 220 using the fixed size approach, and may perform step 410 for other tracks on disk 220 using the variable size approach.

In an embodiment, when a disturbance or imperfection to disk 220 is symmetrical (such as in warping or potato chipping of disk 220), an analysis of the soft error rate of the data written on the tracks of disk 220 will have a similar profile around the rev (i.e., along the length of the circular track). Thus, it may be possible to select one track, perform step 410 on that track, and then use the determined recording density for that track on other tracks, such as other tracks in the same zone or on the same disk.

On the other hand, when a disturbance or imperfection to disk 220 is asymmetrical (such as when the disturbance or imperfection is caused by magnetic sputtering), then an analysis of the soft error rate profile of the data written to a track in the middle of disk 220 might be quite dissimilar to the soft error rate profile of the data written to a track near the edge of disk 220. For example, magnetic sputtering might produce a disturbance on disk 220 that has a shape of a circle. Thus, certain tracks which intersect the middle of the circle-shaped disturbance will have a different soft error rate profile than other tracks which intersect the edge of the circle-shaped disturbance. As a result, if every recording zone of disk 220 is customized, it may be advantageous to select one track and performed step 410 on each selected track. If the soft error rate profile for each selected track is the same or similar, then it may be appropriate to use the same recording density for each zone. However, if the soft error rate profile for each selected track is different, then it may be appropriate to perform step 410 on two or more tracks in each zone to determine what the average recording density for tracks in that zone should be.

In step 420, data is written to each portion at a recording density, or bit density, independent of any other portion. Using embodiments of the invention, one or more electronic components may be configured to write data to a first track portion of a track at a different frequency than to a second track portion of the same track.

Figure 5:
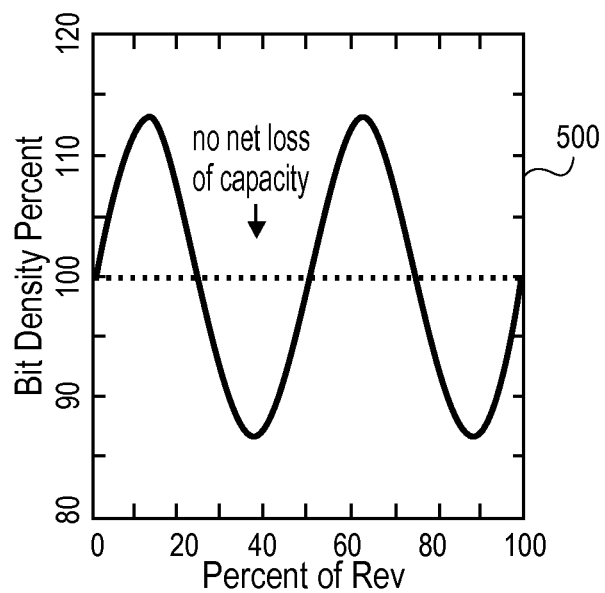
FIG. 5 is an illustration of several graphs showing the operation of writing data at different frequencies in the circumferential direction according to an embodiment of the invention.
Figure 5:
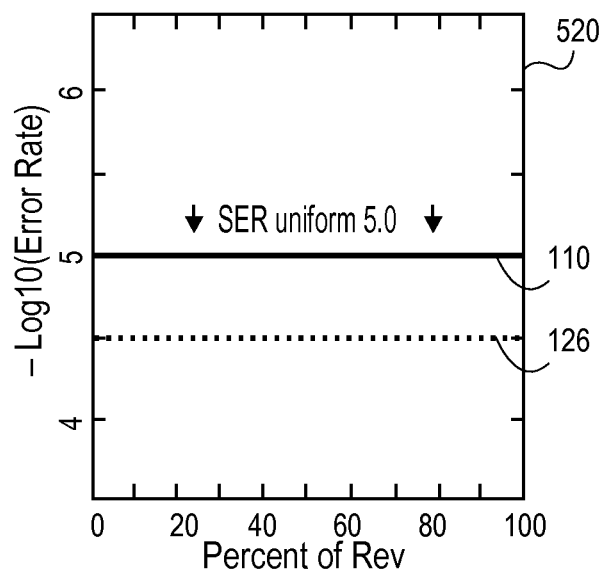

FIG. 5 is an illustration of several graphs showing the operation of writing data at different frequencies in the circumferential direction according to an embodiment of the invention. Graph 500 illustrates bit density of a track going around the rev, and graph 520 illustrates the soft error rate of a track going around the rev. As shown by graph 500, the recording density (BPI) is allowed to vary around the track proportional to the soft error rate (SER) at a default BPI, which is depicted in graph 120. In this way, the strong regions of a track will be tightened and the weak regions will be relaxed, thereby leading to a uniform average soft error rate (SER) that is unchanged from the initial average 110, as shown in graph 520.

Advantageously, embodiments of the invention prevent any net loss of capacity on a track, as opposed to the prior art approach depicted in graph 160. Moreover, embodiments provide an extra soft error rate (SER) margin against the safe operating limit 126, as shown in graph 520.

Firmware Modifications

In an embodiment, the firmware of HDD 200 would be required to support the capability for recording density (BPI) variation around the length of the track. For example, channel register updates may have to occur when the heads fly over the marks that demarcate track portions, so that each track portion is able to have its own write frequency and tap values. Pre-amplification write parameters may also change by track portions to reflect the recording density variations, and these pre-amplification register loads would have to occur at the same time. Tables or other information that describe parameters by head/zone would need to expand to a third dimension to include track portion.

Additional manufacturing test code may be required to independently customize each track portion within each zone on the disk. This may involve pre-amplification write parameters selection, channel tap equalization, precompensation selection, and gate timing adjustments. If used excessively, customizing each track portion within each zone could take a non-trivial amount of time, and so an efficient implementation may involve using rev-averaged results in situations when soft error rate looks relatively uniform around the rev, and only performing the steps of FIG. 4A for particular tracks where soft error rate around the rev dips below a safe operating limit.

Additional Embodiments

Embodiments of the invention may also be applied in the context of improving efficiency rather than, or in addition to, simply reducing yield risk. If test time for HDD 200 is not a significant factor, embodiments of the invention may be used to tighten the recording density (BPI) wherever the soft error rate (SER) is found to be able to accommodate an increase in recording density (BPI), thereby raising average track capacity. This extra space could be accumulated across heads in the drive to accommodate a relatively weaker head that would otherwise cause the drive to fail to meet the HDD's capacity quota. In other words, the test time could be invested in squeezing out the excess margin from the good soft error rate (SER) locations in order to have more in reserve to accommodate weaker locations.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed:

1. A hard-disk drive comprising:
    a magnetic read/write head;
    a magnetic-recording disk rotatably mounted on a spindle, wherein the magnetic-recording disk comprises a plurality of concentric tracks on which data may be written;
    a drive motor having a motor shaft attached to the spindle for rotating the magnetic-recording disk;
    a voice-coil motor configured to move the magnetic read/write head to access portions of the magnetic-recording disk; and
    one or more electronic components configured to (a) divide a track, of the plurality of concentric tracks, into a plurality of portions, and (b) write data to each of the plurality of portions at a recording density that is independent of the recording density used in any other portion of the plurality of portions.

2. The hard-disk drive of claim 1, wherein the one or more electronic components are configured to write data to a first portion of the plurality of portions at a different frequency than to a second portion of the plurality of portions, and wherein the first portion and the second portion are on the same track.

3. The hard-disk drive of claim 1, wherein each of the plurality of portions are of equal length.

4. The hard-disk drive of claim 1, wherein the one or more electronic components divide the track into the plurality of portions by performing:
    determining a length and position on the track for each of the plurality of portions based on an error rate of data read from a plurality of positions on the track.

5. The hard-disk drive of claim 1, wherein the one or more electronic components are further configured to perform:
    determining a frequency at which data should be written for each of the plurality of portions of the track.

6. The hard-disk drive of claim 5, wherein the frequency at which data should be written for each of the plurality of portions is determined to achieve a desired average error rate for data read from the track.

7. The hard-disk drive of claim 5, wherein determining the frequency at which data should be written comprises:
    writing data to all of the plurality of portions at an initial frequency;
    determining an error rate for reading data from each of the plurality of portions using the initial frequency, wherein a first set of portions of the plurality of portions has a better error rate at the initial frequency than a second set of portions of the plurality of portions; and
    updating the initial frequency at which data is written to the first set portions to an increased frequency, wherein the increased frequency is determined by increasing the initial frequency by an amount proportional to the amount the initial frequency needs to be decreased to write data to the second set portions to accommodate a safe operating limit for the second set of portions.

8. The hard-disk drive of claim 7, wherein updating the initial frequency is performed once during, or contemporaneous with, the manufacturing of the hard-disk drive.

9. The hard-disk drive of claim 5, wherein the track is a first track,
    wherein the frequency is a first frequency, wherein the plurality of portions is a first plurality of portions, and wherein the one or more electronic components are further configured to perform:
    determining a second frequency at which data should be written for each of a second plurality of portions of a second track; and
    upon determining that the first frequency at which data should be written for each of the first plurality of portions is the same or similar to the second frequency at which data should be written in corresponding portions in the second plurality of portions, using the first frequency or second frequency to write data to corresponding portions of two or more other tracks, of the plurality of concentric tracks, other than the first track and the second track.

10. The hard-disk drive of claim 5, wherein the track is a first track, wherein the frequency is a first frequency, wherein the plurality of portions is a first plurality of portions, and wherein the one or more electronic components are further configured to perform:
    determining a second frequency at which data should be written for each of a second plurality of portions of a second track; and
    upon determining that the first frequency at which data should be written for each of the first plurality of portions is different than the second frequency at which data should be written in corresponding portions in the second plurality of portions, measuring an error rate of data written to one or more other tracks, of the plurality of concentric tracks, to determine the frequency at which data should be written for two or more of the plurality of concentric tracks.

11. The hard-disk drive of claim 1, wherein the one or more electronic components include the disk controller of the hard-disk drive.

12. The hard-disk drive of claim 1, wherein the writing of data to each of the plurality of portions improves a soft error rate for the track greater than an average soft error rate for the plurality of concentric tracks.

13. The hard-disk drive of claim 1, wherein the one or more electronic components are configured to update one or more channel registers when the head fly over the marks that demarcate track portions so that each portion, of the plurality of portions, is assigned a write frequency independent of other portions of the plurality of portions.

14. The hard-disk drive of claim 1, wherein the one or more electronic components are further configured to measure the soft error rate around the length of the track to determine whether the track should be divided into the plurality of concentric tracks to enable data to be written to each of the plurality of portions at a bit density that is independent of any other portion of the plurality of portions.

15. The hard-disk drive of claim 1, wherein a first set of the plurality of concentric tracks have data written at different recording densities in the circumferential direction, and wherein a second set of the plurality of concentric tracks have data written at a single recording density in the circumferential direction.

16. A hard-disk drive, comprising:
   one or more electronic components configured to (a) divide a single track on a magnetic-recording medium into a plurality of portions, and (b) write data to each of the plurality of portions at a bit density that is independent of any other portion of the plurality of portions.

17. The hard-disk drive of claim 16, wherein the one or more electronic components are configured to write data to a first portion of the plurality of portions at a different frequency than to a second portion of the plurality of portions, and wherein the first portion and the second portion are on the same track.

18. A method for writing data to a single track of a hard-disk drive, comprising:
   dividing the single track of a magnetic-recording medium into a plurality of portions; and
   writing data to each of the plurality of portions on the single track at a bit density that is independent of any other portion of the plurality of portions on the single track.

19. The method of claim 18, wherein writing data to each of the plurality of portions includes:
   writing data to a first portion of the plurality of portions at a different frequency than to a second portion of the plurality of portions, wherein the first portion and the second portion are on the same track.

* * * * *